(12) United States Patent
Lee et al.

(10) Patent No.: US 7,440,361 B2
(45) Date of Patent: Oct. 21, 2008

(54) OPTICAL PICKUP APPARATUS

(75) Inventors: Jin-won Lee, Gyeonggi-do (KR);
Kwang Kim, Gyeonggi-do (KR);
Seok-jung Kim, Gyeonggi-do (KR);
Chong-sam Chung, Gyeonggi-do (KR);
Hea-jung Suh, Hwaseong-gun (KR);
Jong-chul Choi, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 612 days.

(21) Appl. No.: 10/778,169

(22) Filed: Feb. 17, 2004

(65) Prior Publication Data
US 2004/0184367 A1   Sep. 23, 2004

(30) Foreign Application Priority Data
Feb. 26, 2003   (KR) ............... 10-2003-0011957

(51) Int. Cl.
*G11B 7/00* (2006.01)
(52) U.S. Cl. ............... 369/44.11; 369/112.01
(58) Field of Classification Search ........... 369/44.11, 369/112.01
See application file for complete search history.

(56) References Cited

U.S. PATENT DOCUMENTS

| 3,893,769 | A | * | 7/1975 | Woolley ............... 356/312 |
| 4,403,316 | A | * | 9/1983 | van de Veerdonk ........ 720/662 |
| 5,600,619 | A | * | 2/1997 | Takekoshi et al. ...... 369/112.01 |
| 5,687,155 | A | * | 11/1997 | Fukakusa et al. ....... 369/112.06 |
| 5,761,178 | A | * | 6/1998 | Fukakusa et al. ....... 369/112.27 |
| 6,901,598 | B1 | * | 5/2005 | Freeman et al. ............. 720/659 |
| 2001/0004370 | A1 | * | 6/2001 | Miyajima et al. ............. 372/36 |
| 2002/0075784 | A1 | | 6/2002 | Kim |
| 2002/0101796 | A1 | * | 8/2002 | Freeman et al. ............. 369/43 |
| 2003/0179667 | A1 | * | 9/2003 | Yoshinaka et al. ....... 369/44.41 |
| 2004/0246999 | A1 | * | 12/2004 | Yamazaki et al. ............. 372/10 |

FOREIGN PATENT DOCUMENTS

| JP | 6-243499 | 9/1994 |
| JP | 06-243499 | 9/1994 |
| JP | 8-235556 | 9/1996 |
| JP | 08-235556 | 9/1996 |
| JP | 8-287499 | 11/1996 |
| JP | 2002-123958 | 4/2002 |
| JP | 2002-203328 | 7/2002 |
| JP | 2002-279782 | 9/2002 |
| JP | 2002-365406 | 12/2002 |
| JP | 2004-259247 | 9/2004 |

OTHER PUBLICATIONS

Machine Translation of JP 08-287499 A.*

(Continued)

*Primary Examiner*—Wayne Young
*Assistant Examiner*—LaTanya Bibbins
(74) *Attorney, Agent, or Firm*—Stein, McEwen & Bui, LLP (57) ABSTRACT

An optical pickup apparatus including a swing arm pivotably installed in a tracking direction with respect to a disc, and an optical pickup unit supported by the swing arm and driven in a focusing direction, wherein the optical pickup unit includes a laser diode, an objective lens to focus light emitted from the laser diode on a recording surface of the disc, and a heat sink plate to dissipate heat generated from the laser diode, wherein the heat sink plate is provided close to the disc so as to be directly exposed to wind generated during rotation of the disc.

12 Claims, 9 Drawing Sheets

OTHER PUBLICATIONS

Chinese Office Action dated Sep. 30, 2005 issued in co-pending Chinese Patent Application No. 200410006772.2.
European Search Report issued Apr. 4, 2007 by the European Patent Office re: European Patent Application No. 04261033.9-1232 (3 pp).
European Search Report issued Apr. 4, 2007 by the European Patent Office re: European Patent Application No. 04261033.9-1232 (3 pp).
Japanese Office Action dated Apr. 11, 2006 issued in corresponding Japanese Application No. 2004-44161.

* cited by examiner

OPTICAL PICKUP APPARATUS

CROSS-REFERENCE TO RELATED APPLICATIONS

This application claims the priority of Korean Patent Application No. 2003-11957, filed on Feb. 26, 2003, in the Korean Intellectual Property Office, the disclosure of which is incorporated herein by reference.

BACKGROUND OF THE INVENTION

1. Field of the Invention

The present invention relates to an optical pickup apparatus, and, more particularly, to a miniature optical pickup apparatus which is modularized so that an objective lens and an optical system move in a body. The present invention is effective in a drive apparatus in which the working distance between an optical pickup actuator and a media disc, which is a recording medium, is maintained to be not more than 0.5 mm, which is considerably smaller than the conventional working distance of 1 mm.

2. Description of the Related Art

A typical optical pickup apparatus used in optical disc drives such as CD players or DVD players includes a fixed unit having optical elements such as a laser diode and a photodiode, a mobile unit having an objective lens, and an actuator performing a control of an accurate position of the objective lens by adjusting the position of the mobile unit.

However, when the optical disc drive having the above structure is applied to portable appliances such as laptop computers or PDAs, a more compact structure is needed. Thus, the optical pickup is integrally modularized without separating the fixed unit and the mobile unit. The optical pickup is referred to as a miniature optical pickup apparatus.

Figure 1:
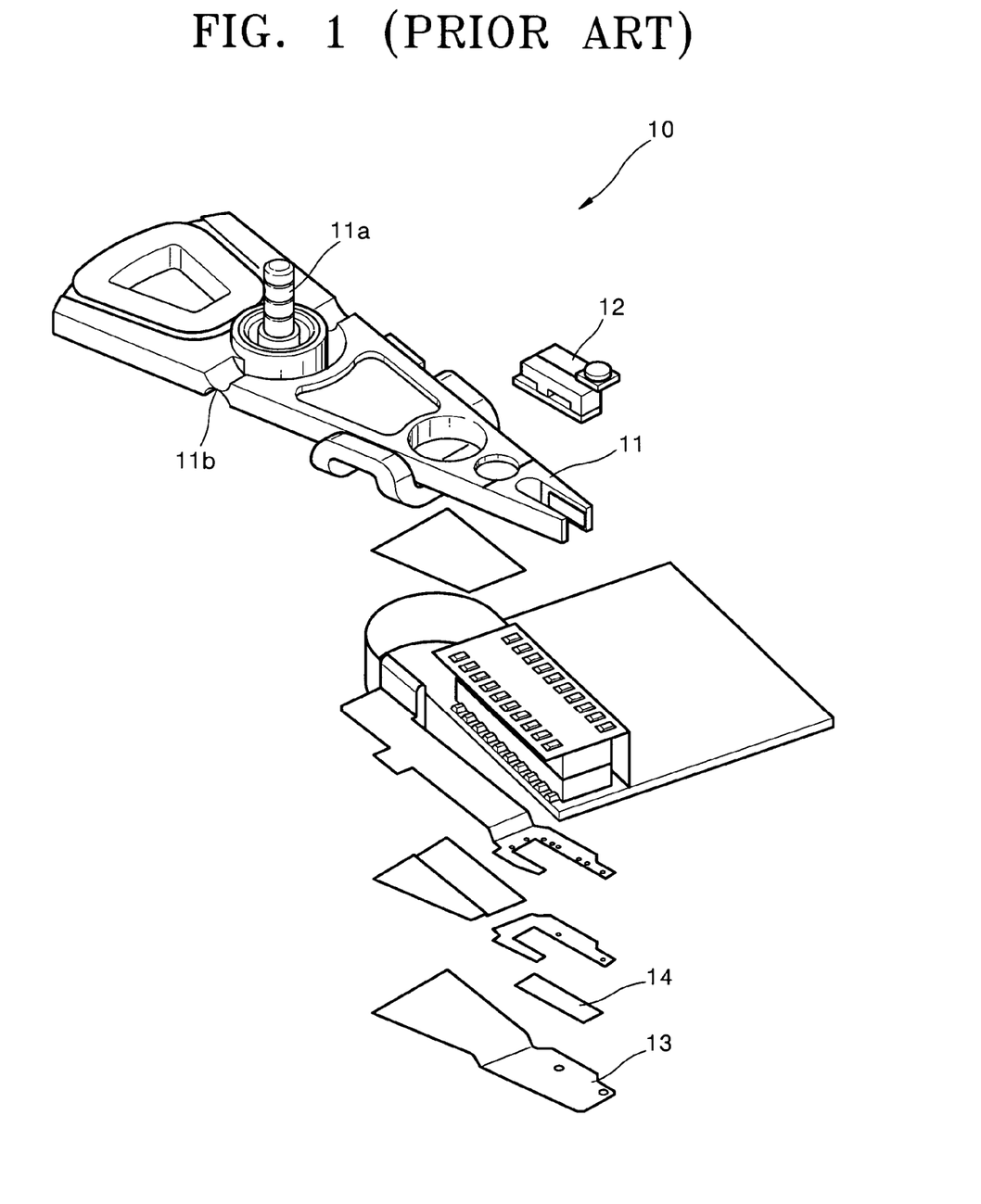
FIG. 1 is an exploded perspective view illustrating a conventional optical pickup apparatus.
Figure 2:
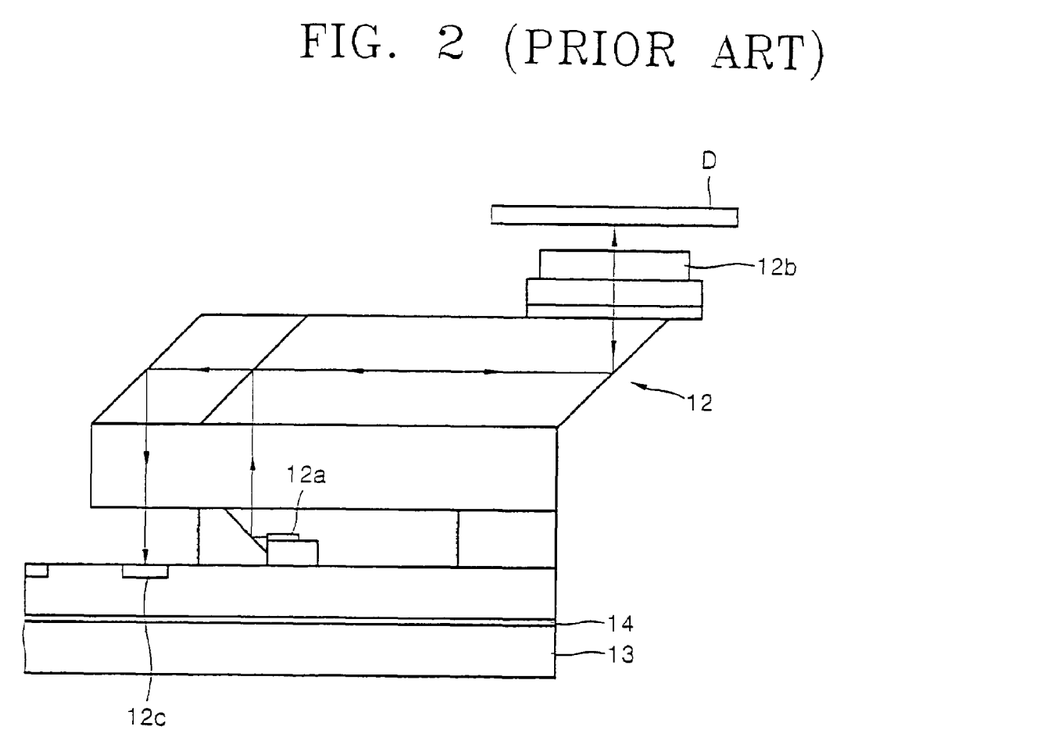
FIG. 2 is a view illustrating an optical pickup unit of the optical pickup apparatus shown in FIG. 1.

FIGS. 1 and 2 show the structure of a conventional miniature optical pickup apparatus which is disclosed in PCT International Publication No. WO 02/29792 A2.

As shown in the drawings, an optical pickup apparatus 10 has a structure in which an optical pickup unit 12 is installed on one end portion of a swing arm 11. The swing arm 11 includes a first pivot 11a and a second pivot 11b. Thus, for the tracking control of the optical pickup unit 12, the swing arm 11 pivots left and right around the first pivot 11a while, for focusing control of the optical pickup unit 12, the one end of the swing arm 11 tilts up and down around the second pivot 11b.

As shown in FIG. 2, the optical pickup unit 12 includes a laser diode 12a, an objective lens 12b focusing light on a recording surface of a disc D, and a photodetector 12c receiving light reflected by the disc D. Thus, the light emitted from the laser diode 12a passes along an inner optical path of the optical pickup unit 12 and focuses on the recording surface of the disc D through the objective lens 12b. The light reflected by the disc D passes along the inner optical path and arrives on the photodetector 12c.

A heat sink plate 13 is coupled to the optical pickup unit 12 via a thermal conductive adhesive tape 14. The heat sink plate 13 dissipates heat generated from the optical pickup unit 12 during operation of the optical pickup apparatus 10. That is, when the laser diode 12a begins to emit light, heat is generated at the same time. If the heat is not properly dissipated, the laser diode 12a is overheated, and a malfunction is very likely to occur. Thus, the heat sink plate 13 performs a function of dissipating the heat transferred from the optical pickup unit 12 to the outside air.

Due to a trend of providing higher density in a recording medium such as an optical disc, increased optical power is required in an optical pickup apparatus. However, if a superior heat radiation efficiency is not provided in the higher powered optical pickup apparatus, the entire performance of a disk drive may be deteriorated. In the above-described conventional heat radiation structure, since the heat from the laser diode 12a is dissipated through the heat sink plate 13 only, the speed of heat radiation is slow, and a superior heat radiation efficiency cannot be expected. That is, assuming that the temperature at which the laser diode 12a is stably operated is about 80° C., when the laser diode 12a is overheated due to the heat radiation not being properly performed, the wavelength of the light is changed, and a malfunction may be generated. Also, since the threshold current of the laser diode 12a increases as the temperature increases, the amount of the heat generated increases, and the life span of the laser diode is shortened.

Therefore, a new heat radiation structure is needed which will result in a superior heat radiation efficiency.

SUMMARY OF THE INVENTION

To solve the above and/or other problems, the present invention provides an optical pickup apparatus which has a heat radiation structure in which the heat from the laser diode is dissipated by using wind generated during rotation of a recording medium.

Additional aspects and/or advantages of the invention will be set forth in part in the description which follows and, in part, will be obvious from the description, or may be learned by practice of the invention.

According to an aspect of the present invention, an optical pickup apparatus including a swing arm pivotably installed in a tracking direction with respect to a disc and an optical pickup unit supported by the swing arm and driven in a focusing direction, wherein the optical pickup unit comprises a laser diode, an objective lens to focus light emitted from the laser diode on a recording surface of the disc, and a heat sink plate to dissipate heat generated from the laser diode, wherein the heat sink plate is provided close to the disc so as to be directly exposed to wind generated during rotation of the disc.

The present invention is applied to an optical pickup drive having a working distance of not more than 0.5 mm, so that an effect of flow of air by the rotation of a disc by the rotation of a spindle is obtained. The present invention concerns an optical pickup structure which can improve a cooling effect by effectively transferring the heat generated from the laser diode, which is a heat source, to one or more heat sinks having a relatively large volume and surface area.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 3:
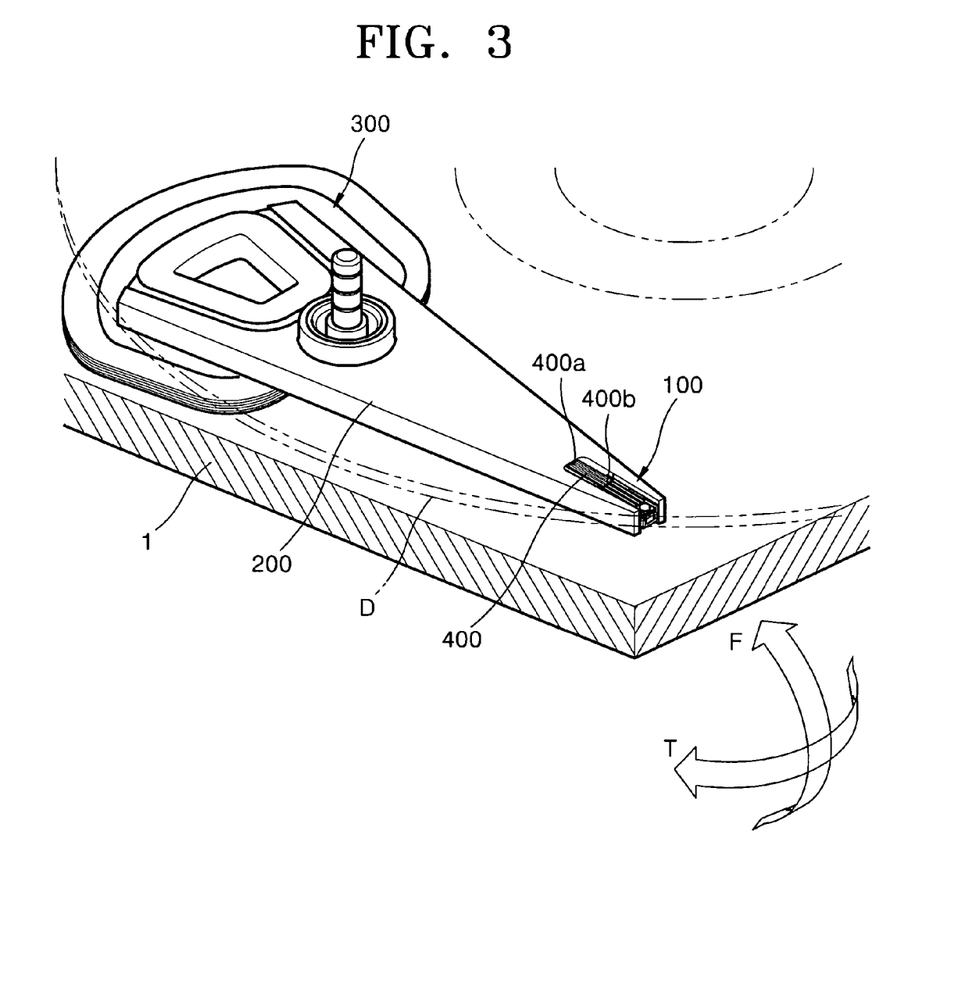
FIG. 3 is a perspective view illustrating an optical pickup apparatus according to an embodiment of the present invention.

Referring to FIG. 3, in an optical pickup apparatus according to an embodiment of the present invention, a swing arm 200 is pivotably installed on a base 1 which accommodates a disc D, which is a recording medium. An optical pickup unit 100 is provided at one end of the swing arm 200. The swing arm 200 is driven by a voice coil motor 300 to pivot in a tracking direction T, that is, a direction in which the optical pickup unit 100 moves between tracks on the disc D. A leaf spring 400, which is an elastic member, is installed at the swing arm 200. One end portion 400a of the leaf spring 400 is fixed to the swing arm 200 and the other end portion 400b thereof is a free end portion which can be deformed in a focus direction F. The optical pickup unit 100 is coupled to the free end portion 400b. Thus, the focusing action of the optical pickup unit 100 is performed by deforming the leaf spring 400 in the focus direction F.

Figure 4:
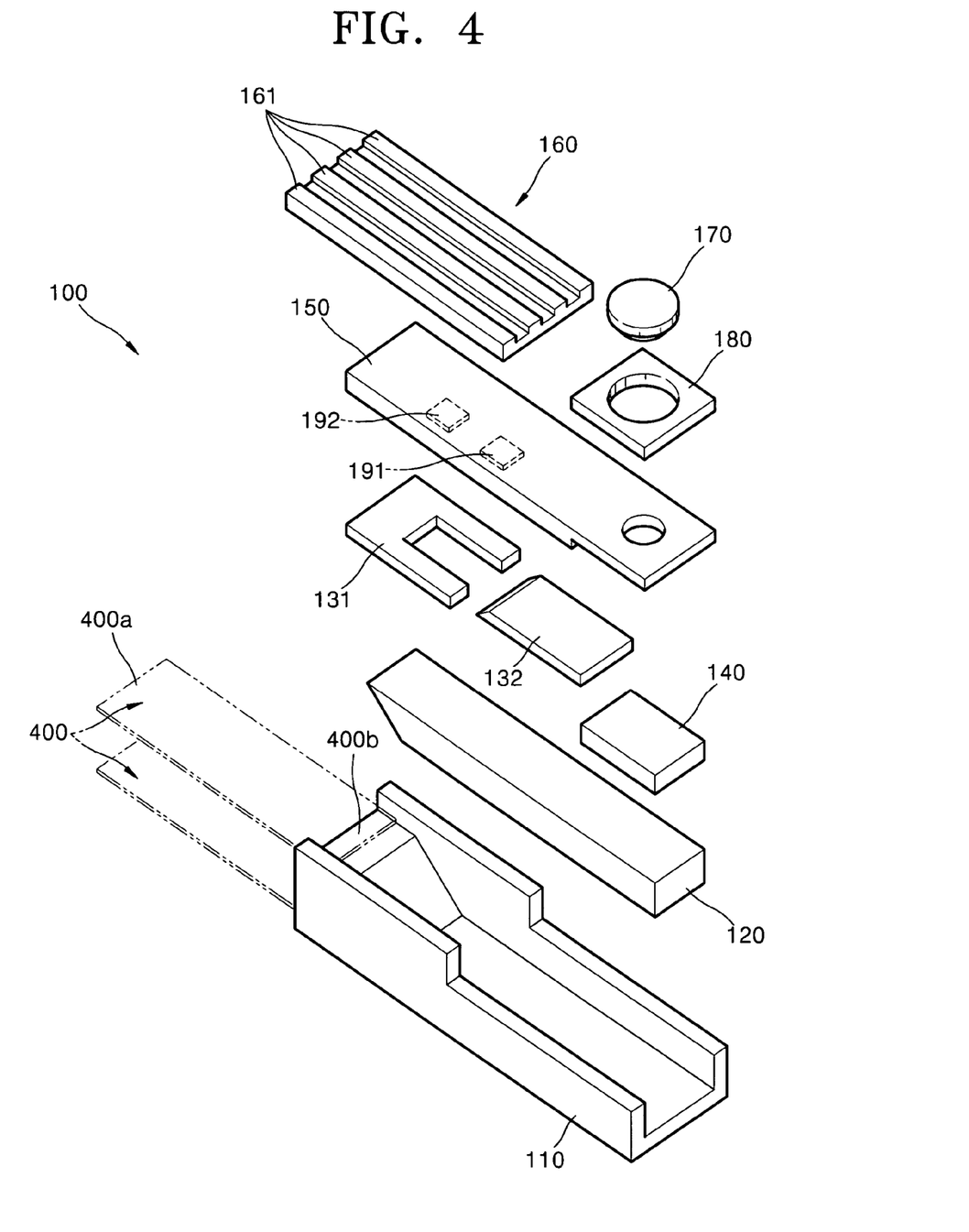
FIG. 4 is an exploded perspective view illustrating an optical pickup unit of the optical pickup apparatus shown in FIG. 3.

The optical pickup unit 100, as shown in FIG. 4, includes a bobbin 110 coupled to the free end portion 400b of the leaf spring 400 and various optical elements mounted on the bobbin 110. The optical elements include a laser diode 191 that is a light source, a polarized beam splitter/prism block 120 and a wavelength plate/hologram device 140 forming an optical path, an objective lens 170 to focus light on a recording surface of the disc D, a photodetector 192 to receive the light reflected by the recording surface of the disc D, a silicon wafer SiOB 150 to electrically connect the respective elements, and a heat sink plate 160 for heat radiation of the laser diode 191. Thus, the light emitted from the laser diode 191 passes along an inner optical path of the optical pickup unit 100 and focuses on the recording surface of the disc D through the objective lens 170. The light reflected by the recording surface of the disc D passes along the inner optical path and arrives at the photodetector 192. Reference numeral 180 denotes an objective lens holder, and reference numerals 131 and 132 denote spacers.

In this embodiment of the present invention, the heat sink plate 160 is provided on the uppermost surface of the optical pickup unit 100 such that the disc D can be accommodated directly above and close to the heat sink plate 160. This exposes the heat sink plate 160 directly to wind generated during the rotation of the disc D. That is, the heat generated from the laser diode 191 is transferred to the heat sink plate 160 through the silicon wafer 150 attached to the laser diode 191 and is dissipated to the external air. When the heat sink plate 160 is arranged so that it closely faces the disc D, since the wind generated during the rotation of the disc D directly contacts the heat sink plate 160, the heat sink plate 160 is very rapidly cooled by the wind. Thus, an efficiency of heat radiation is drastically improved compared to the method which relies on radiation only. In the present embodiment, a plurality of heat radiation fins 161 are provided on an upper surface of the heat sink plate 160 so that a contact area with the wind is increased.

Figure 5:
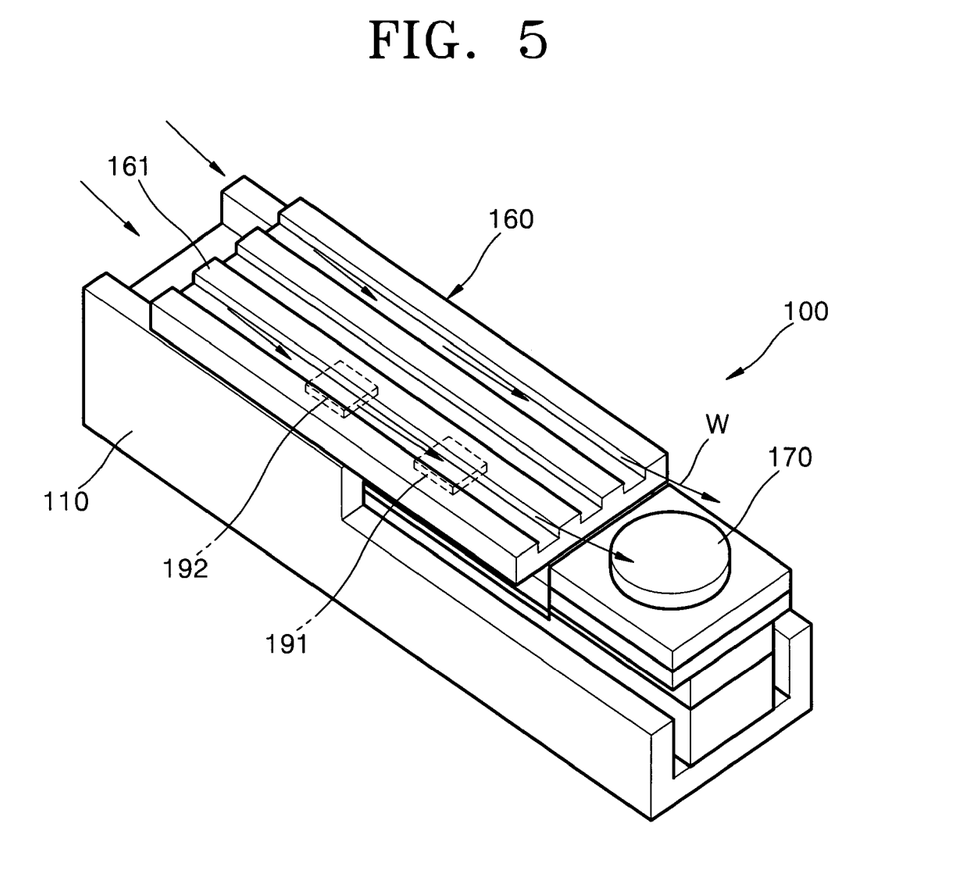
FIG. 5 is a perspective view illustrating the optical pickup unit shown in FIG. 3 in an assembled state.

In the structure described above, as the disc D rotates, a flow of air, that is, wind W, is generated, as shown in FIG. 5, so that the wind flows while directly contacting the heat sink plate 160. As a result, the heat transferred from the laser diode 191 to the heat sink plate 160 is very rapidly dissipated by the contact with the wind W. Thus, the possibilities of the laser diode 191 being overheated are greatly reduced.

Figure 6:
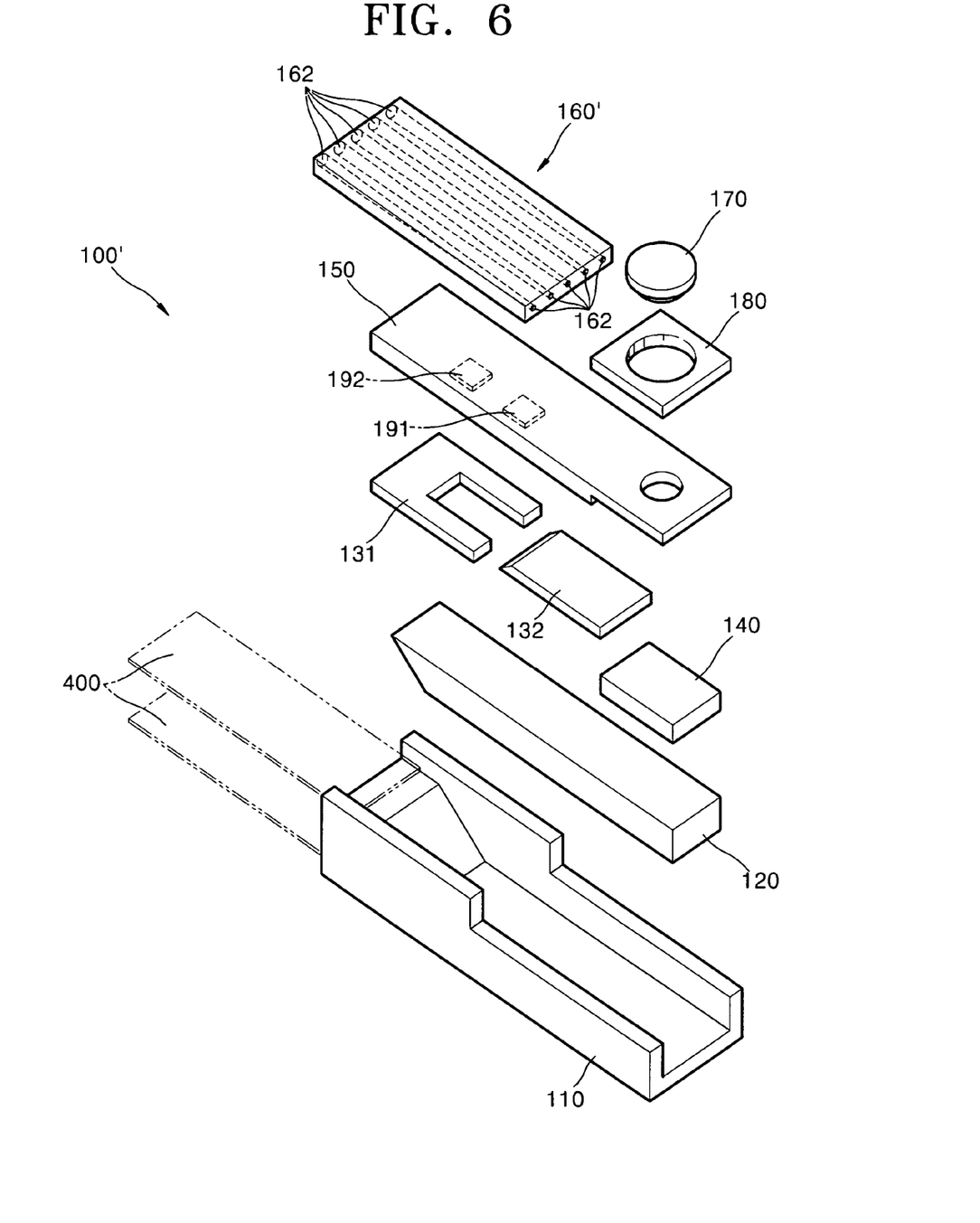
FIG. 6 is an exploded perspective view illustrating an optical pickup unit of an optical pickup apparatus according to another embodiment of the present invention.

FIG. 6 shows an optical pickup unit of an optical pickup apparatus according to another embodiment of the present invention.

Figure 7:
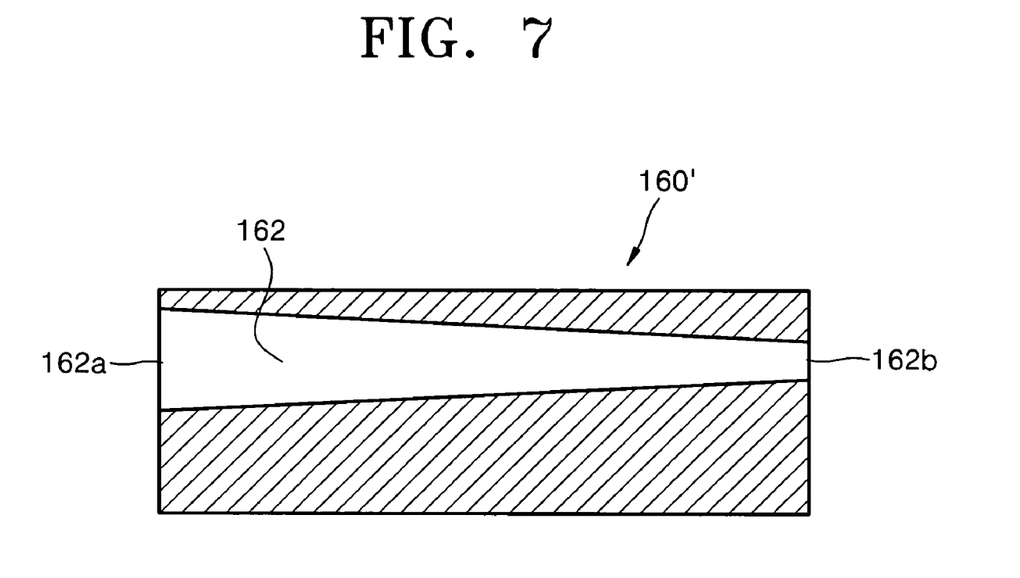
FIG. 7 is a sectional view illustrating a heat sink plate of the optical pickup unit shown in FIG. 6.

In this embodiment of the present invention, a plurality of through holes 162 are formed in a heat sink plate 160' of an optical pickup unit 100', instead of the heat radiation fins 160 of the previously discussed embodiment. The through holes 162, as shown in FIG. 7, may be formed such that the sectional area thereof decreases from an inlet 162a to an outlet 162b. Then, the speed of flow varies between the inlet 162a and the outlet 162b so that a difference in pressure is generated therebetween. Thus, the wind generated during the rotation of the disc D not only contacts the surface of the heat sink plate 160', but also is drawn in through the through holes 162 so that the inside and outside of the heat sink plate 160' are simultaneously cooled.

Figure 8:
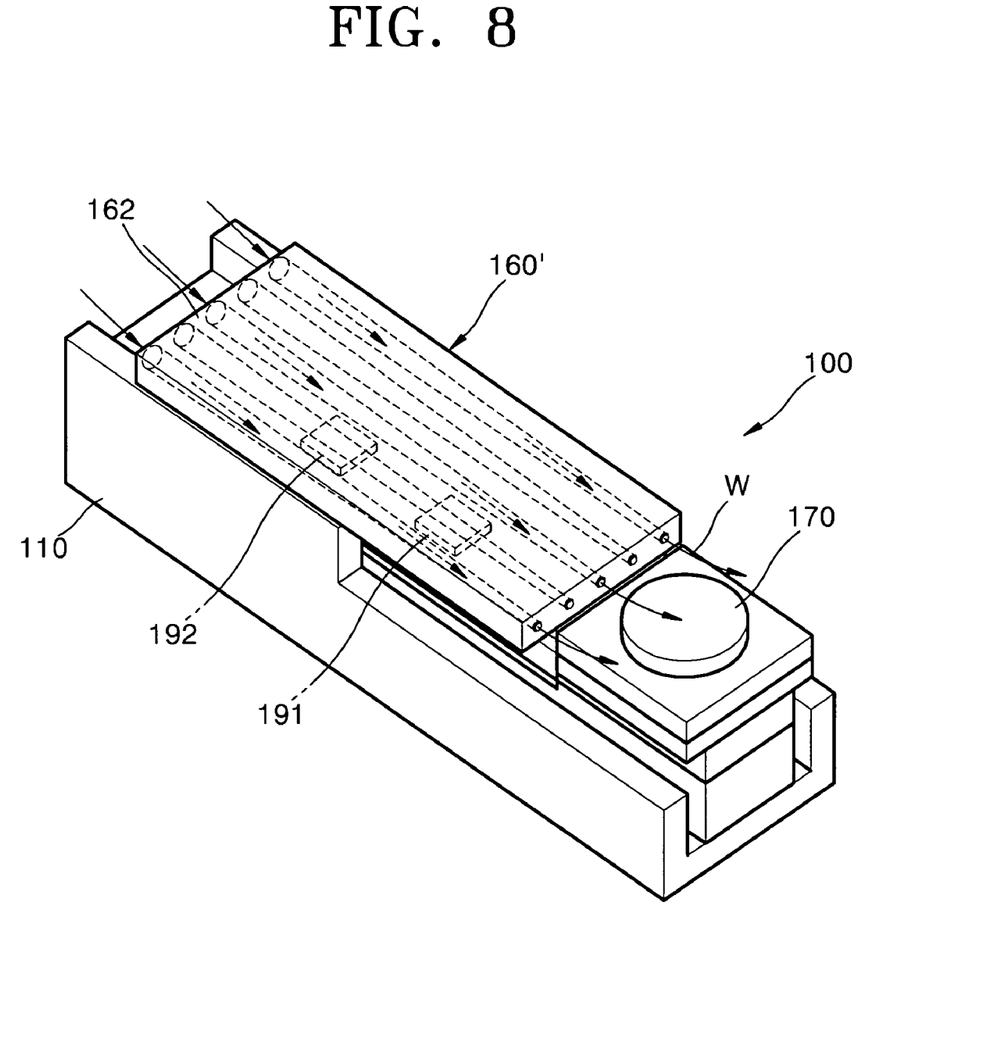
FIG. 8 is a perspective view illustrating the optical pickup unit shown in FIG. 6 in an assembled state.

In the structure described above, as the disc D rotates, the wind W is generated, as shown in FIG. 8, and the wind proceeds while directly contacting the surface of the heat sink plate 160' and the inside of the through hole 162. Accordingly, the heat transferred from the laser diode 191 to the heat sink plate 160' is very rapidly dissipated, due to the contact with the wind W, so that the laser diode 191 is effectively cooled.

Although most heat generated from the laser diode 191 is dissipated through the heat sink plates 160 and 160', part of the heat is transferred to the bobbin 110. Thus, when the bobbin 110 is made of a metal material having a superior heat conductivity, such as aluminum or magnesium, an efficiency in heat radiation is further improved.

Figure 9:
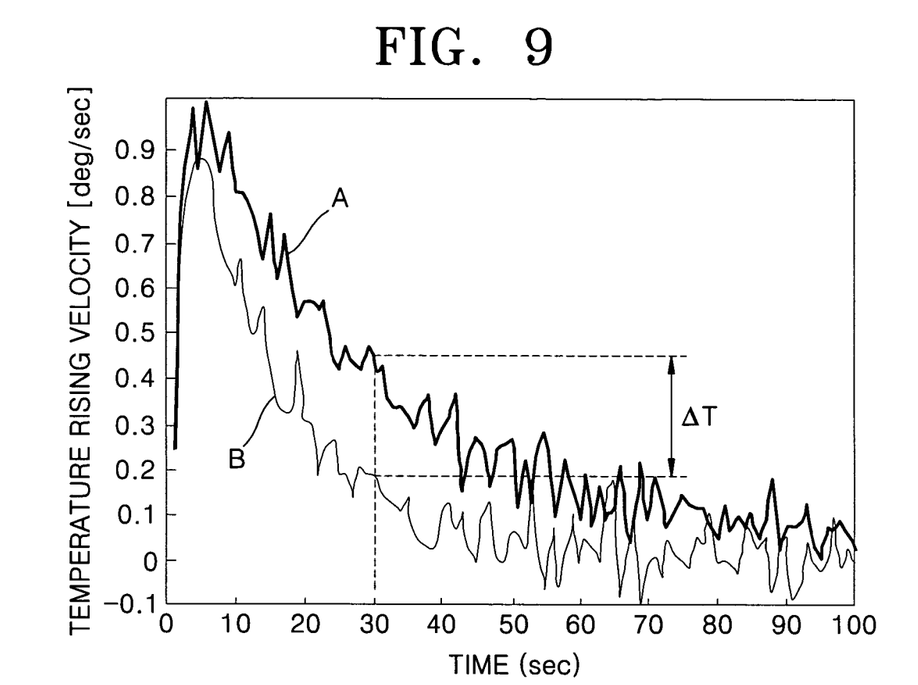
FIG. 9 is a graph showing a temperature rising velocity according to a change in time with respect to the conventional optical pickup unit and the optical pickup unit of the present invention.

A test and a result of measurement with respect to an embodiment of the present invention is described below. FIG. 9 is a graph showing a temperature rising velocity according to a change in time with respect to the conventional optical pickup unit and the optical pickup unit of the present invention.

Line A in FIG. 9 indicates a temperature rising velocity according to the passage of time in the conventional optical pickup unit, while line B indicates a temperature rising velocity according to the passage of time in the optical pickup unit according to the present invention. That is, line B shows the change in the temperature according to the rotation of a disc close to the heat sink plate. It can be seen that a difference ΔT in the temperature rising velocity between the lines A and B after about 30 seconds is about 0.3 deg/sec.

Figure 10:
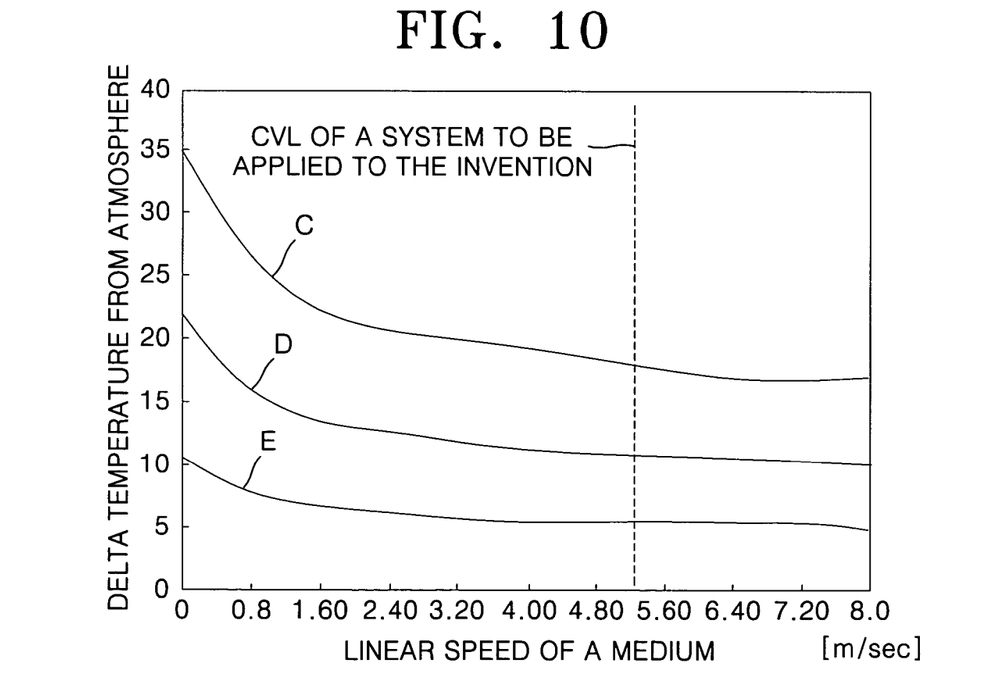
FIG. 10 is a graph showing a level of reduction in temperature according to a change in linear speed of the optical disc according to an embodiment of the present invention.

FIG. 10 is a graph showing a level of reduction in temperature according to a change in linear speed of the optical disc according to an embodiment of the present invention. In the drawing, lines C, D, and E indicate degrees of reduction in temperature according to changes in linear speed with respect to heat generation power during recording, an arbitrary intermediary heat generation power, and heat generation power during reproduction, respectively.

Observing line C, it can be seen that the temperature is not more than 20° C. at the linear speed of an optical disc of about 5.3 mm/sec in the present invention. As a result, a remarkable cooling effect exists because the temperature is lowered by about 57% compared to the temperature of 35° C. when the optical disc is not rotating.

The heat sink plate receives heat by a surface contact between the laser diode and the silicon wafer that are heat generating sources. Since the heat sink plate or heat sink dissipates the transferred heat, a change in characteristics of the laser diode and/or a malfunction of a system is prevented.

As described above, in the optical pickup apparatus according to the present invention, since the heat sink plate which dissipates the heat from the laser diode is installed close to the disc, so as to be directly exposed to wind generated during the rotation of the disc, an efficiency in heat radiation is maximized. Thus, a phenomenon of the laser diode being overheated can be prevented.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An optical pickup unit to be used in an optical pickup apparatus, the optical pickup unit comprising:
   a light source mounted on a bobbin, to emit a light beam;
   an objective lens secured in a lens holder and mounted on the bobbin, to focus the light beam emitted from the light source on a recording surface of an optical recording medium; and
   a heat sink plate mounted on the bobbin over the light source and adjacent to the objective lens, and disposed between the light source and the optical recording medium in a focusing direction, to dissipate heat generated at least from the light source;
   wherein the heat sink plate is provided on an uppermost surface of the bobbin, adjacent to the lens holder, and closest to the optical recording medium, so that the heat generated from the light source and transferred to the heat sink plate is dissipated by an air flow generated during rotation of the optical recording medium.

2. The optical pickup unit as claimed in claim 1, wherein the heat sink plate is provided with a base with a flat bottom surface and a plurality of heat radiation (cooling) fins projecting upwardly from the base.

3. The optical pickup unit as claimed in claim 1, wherein the heat sink plate is provided with a plurality of through holes through which air passes.

4. The optical pickup unit as claimed in claim 1, wherein the heat sink plate is provided with a base with a flat bottom surface coupled to the light source, and a plurality of heat radiation fins projecting upwardly from the base and forming a plurality of heat dissipation paths to dissipate heat generated from the light source.

5. The optical pickup unit as claimed in claim 1, wherein the heat sink plate is provided with a plurality of through holes through which air passes to dissipate heat generated from the light source.

6. The optical pickup unit as claimed in claim 5, wherein each of the through holes comprises an inlet to receive the air flow generating during the rotation of the optical recording medium and an outlet to the release the air flow along with heat generated from the light source, and a sectional area of each of the through holes decreases from the inlet to the outlet.

7. The optical pickup unit as claimed in claim 1, wherein the light source, the lens holder securing the objective lens, and the heat sink plate are mounted on a bobbin.

8. The optical pickup unit as claimed in claim 7, wherein the bobbin comprises a metal material of aluminum or magnesium.

9. A method of dissipating heat generated in an optical pickup unit while reading data from or writing data to an optical recording medium, the method comprising:
   mounting a light source and an objective lens on a bobbin; and
   mounting a heat sink plate on the light source, adjacent to the objective lens, on the bobbin, between the light source and the optical recording medium in a focusing direction, to dissipate heat generated from the light source;
   wherein the heat sink plate is provided on the uppermost surface of the bobbin and closely faces the optical recording medium so as to increase dissipation of heat generated from the light source and transferred to the heat sink plate by an air flow generated during rotation of the optical recording medium.

10. The method as claimed in claim 9, wherein the heat sink plate is provided with a base with a flat bottom surface coupled to the light source, and a plurality of heat radiation fins projecting upwardly from the base and forming a plurality of heat dissipation paths to dissipate heat generated from the light source.

11. The method as claimed in claim 9, wherein the heat sink plate is provided with a plurality of through holes through which air passes to dissipate heat generated from the light source.

12. The method as claimed in claim 11, wherein each of the through holes comprises an inlet to receive the air flow generating during the rotation of the optical recording medium and an outlet to the release the air flow along with heat generated from the light source, and a sectional area of each of the through holes decreases from the inlet to the outlet.

* * * * *